(12) United States Patent
Matsuura et al.

(10) Patent No.: US 10,409,061 B2
(45) Date of Patent: Sep. 10, 2019

(54) HEAD-UP DISPLAY DEVICE

(71) Applicant: NIPPON SEIKI CO., LTD., Niigata (JP)

(72) Inventors: Kazuya Matsuura, Niigata (JP);
Kazuo Morohashi, Niigata (JP);
Megumi Sato, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 0 days.

(21) Appl. No.: 15/744,010

(22) PCT Filed: Jul. 12, 2016

(86) PCT No.: PCT/JP2016/070503
§ 371 (c)(1),
(2) Date: Jan. 11, 2018

(87) PCT Pub. No.: WO2017/018198
PCT Pub. Date: Feb. 2, 2017

(65) Prior Publication Data
US 2018/0210200 A1  Jul. 26, 2018

(30) Foreign Application Priority Data

Jul. 28, 2015 (JP) ................................ 2015-148896

(51) Int. Cl.
*G02B 27/01* (2006.01)
*B60K 35/00* (2006.01)
*G02B 27/22* (2018.01)

(52) U.S. Cl.
CPC .......... *G02B 27/0101* (2013.01); *B60K 35/00* (2013.01); *B60K 2370/23* (2019.05);
(Continued)

(58) Field of Classification Search
CPC ...... G03B 21/28; G03B 21/2066; G02B 5/10; G02B 27/10; G02B 27/106;
(Continued)

(56) References Cited

U.S. PATENT DOCUMENTS

| 2012/0019781 A1* | 1/2012 | Kuhlman | ............... B60K 35/00 353/13 |
| 2013/0242404 A1* | 9/2013 | Kobayashi | ......... G02B 27/0101 359/630 |

(Continued)

FOREIGN PATENT DOCUMENTS

| JP | 01-92718 A | 4/1989 |
| JP | 07-5886 U | 1/1995 |

(Continued)

OTHER PUBLICATIONS

International Search Report issued in corresponding International Patent Application No. PCT/JP2016/070503, dated Sep. 20, 2016.

*Primary Examiner* — Christina A Riddle
*Assistant Examiner* — Christopher A Lamb, II
(74) *Attorney, Agent, or Firm* — McDermott Will & Emery LLP

(57) ABSTRACT

The purpose of the present invention is to provide a compact and low-cost head-up display device capable of creating a sense of depth in a virtual image. This head-up display device includes a light-emitting device, a reflecting mirror, and a screen. The reflecting mirror includes two reflecting surfaces that are a first reflecting surface having a flat shape and a second reflecting surface having a curved shape. The screen is composed of a first screen through which the light reflected from the first reflecting surface passes, and a second screen through which the light reflected from the second reflecting surface passes. The first screen and the second screen are disposed so that the length of a first optical path in which the light emitted from the light-emitting (Continued)

device reaches the first screen is different from the length of a second optical path in which the light emitted from the light-emitting device reaches the second screen.

8 Claims, 5 Drawing Sheets

(52) U.S. Cl.
CPC .... *B60K 2370/334* (2019.05); *G02B 27/2278* (2013.01); *G02B 2027/0127* (2013.01); *G02B 2027/0185* (2013.01)

(58) Field of Classification Search
CPC ... G02B 27/01–0192; G02B 2027/0101–0198; H04N 9/3147; B60K 35/00
See application file for complete search history.

(56) References Cited

U.S. PATENT DOCUMENTS

| | | | |
|---|---|---|---|
| 2016/0178902 A1 | 6/2016 | Ando et al. | |
| 2016/0195727 A1* | 7/2016 | Kuzuhara | B60K 35/00 359/633 |
| 2017/0235138 A1* | 8/2017 | Morohashi | B60K 35/00 359/631 |

FOREIGN PATENT DOCUMENTS

| | | | | |
|---|---|---|---|---|
| JP | 2003-237412 A | 8/2003 | | |
| JP | 2005-153811 A | 6/2005 | | |
| JP | 2015-034919 A | 2/2015 | | |
| JP | 2016-045252 A | 4/2016 | | |
| WO | WO-2016027706 A1 * | 2/2016 | ............. | B60K 35/00 |

\* cited by examiner

HEAD-UP DISPLAY DEVICE

CROSS REFERENCE

This application is the U.S. National Phase under 35 U.S.C. § 371 of International Application No. PCT/JP2016/070503, filed on Jul. 12, 2016, which claims the benefit of Japanese Application No. 2015-148896, filed on Jul. 28, 2015, the entire contents of each are hereby incorporated by reference.

TECHNICAL FIELD

The present invention relates to an improved head-up display device.

BACKGROUND ART

A conveyance such as a vehicle may have a head-up display device capable of projecting information to the front side of an occupant. The occupant can obtain the information by visually recognizing a virtual image projected to the front side. The technique disclosed in PTL 1 is related art concerning a head-up display device.

A head-up display device as described in PTL 1 includes a first display for displaying a first image, a second display for displaying a second image, a half mirror through which light from the first display passes and which reflects light from the second display, and a front glass (projection surface) onto which light having passed through or being reflected by the half mirror is projected.

As for the lengths of optical paths through which light passes, the length of the optical path from the first display to the front glass is longer than the length of the optical path from the second display to the front glass. This causes the occupant to recognize the first image and the second image closer to the first image. That is, it is possible to generate a sense of depth in a virtual image by projecting the images having different lengths of the optical paths onto the front glass.

However, the head-up display device as described above needs to have two displays for emitting two different types of images. Accordingly, the cost of components becomes high and the device size becomes large.

CITATION LIST

Patent Literature

PTL 1: JP-A-2003-237412

SUMMARY OF INVENTION

Technical Problem

An object of the invention is to provide a low-cost and compact head-up display device capable of generating a sense of depth in a virtual image.

Solution to Problem

In a first aspect of the invention, there is provided a head-up display device including a light-emitting device capable of emitting an image to be projected onto a projection surface, a reflecting mirror reflecting light emitted from the light-emitting device, and a screen on which the light reflected by the reflecting mirror is focused and through which the light passes, in which the reflecting mirror has at least first and second reflecting surfaces, the light emitted from the light-emitting device being incident on the first and second reflecting surfaces, one and the other of the first and second reflecting surfaces are a flat surface and a curved surface or curved surfaces having different shapes, the screen includes a first screen through which the light reflected by the first reflecting surface passes and a second screen through which the light reflected by the second reflecting surface passes, the first screen and the second screen are disposed so that a length of a first optical path in which the light having passed through the first screen reaches the projection surface is different from a length of a second optical path in which the light having passed through the second screen reaches the projection surface, and, when the light reflected by the first reflecting surface that is a curved surface and/or the second reflecting surface that is a curved surface is curved surface reflected light, a lens capable of converging light is provided between the screen through which the curved surface reflected light passes and the light-emitting device.

In a second aspect, the lens is preferably a convex lens, a toroidal lens, or a free curved surface lens.

In a third aspect, an optical axis of the lens is preferably offset with respect to an optical axis of the screen through which the curved surface reflected light passes.

Advantageous Effects of Invention

In the first aspect of the invention, the first screen and the second screen are disposed so that the length of the first optical path is different from the length of the second optical path. The operator of the head-up display device recognizes the image focused on the first screen and the image focused on the second screen so that one is closer to the other. That is, a sense of depth can be generated.

On the other hand, since the first screen and the second screen are disposed so that the length of the first optical path is different from the length of the second optical path, the distance from the reflecting mirror to the first screen is different from the distance from the reflecting mirror to the second screen. Of the first reflecting surface and the second reflecting surface of the reflecting mirror, one is a flat surface and the other is a curved surface or both surfaces are curved surfaces having different shapes. That is, the shape of the first reflecting surface is different from the shape of the second reflecting surface so as to enable focusing on the first screen and the second screen having different distances from the reflecting mirror. This enables adjustment of focusing distances appropriate for them. At this time, the necessary number of the reflecting mirrors is one. Accordingly, the number of the light-emitting devices emitting light to the reflecting mirror is only one. Since the number of the light-emitting devices is only one, the head-up display device can be low-cost and compact.

Accordingly, it is possible to provide the low-cost and compact head-up display device capable of generating a sense of depth in the virtual images.

In addition, a lens capable of converging light is provided between the screen through which the curved surface reflected light passes and the light-emitting device. The curved surface reflected light is reflected in various directions. Since the lens capable of converging light is provided between the screen and the light-emitting device, the curved surface reflected light can pass through the screen without increasing the size of the screen. It is possible to efficiently use the light emitted from the light-emitting device without increasing the size of the head-up display device.

According to the second aspect of the invention, it is possible to control illumination light distribution for adjusting the light distribution with respect to a focal length in a projection optical system of the head-up display device. This can make the illumination light distribution to an eye box of the head-up display device efficient.

According to the third aspect of the invention, it is possible to direct, to a predetermined position of the eye box, the light that passes through the screen through which the curved surface reflected light passes, thereby improving the uniformity of the light in the eye box.

DESCRIPTION OF EMBODIMENTS

Embodiments of the invention will be described with reference to the drawings. It should be noted that the left and the right are based on the occupant of a vehicle and the front and the rear are based on the travel direction of the vehicle in the following description.

Reference Example

First, a head-up display device according to a reference example that is a premise of the invention will be described.

Figure 1:
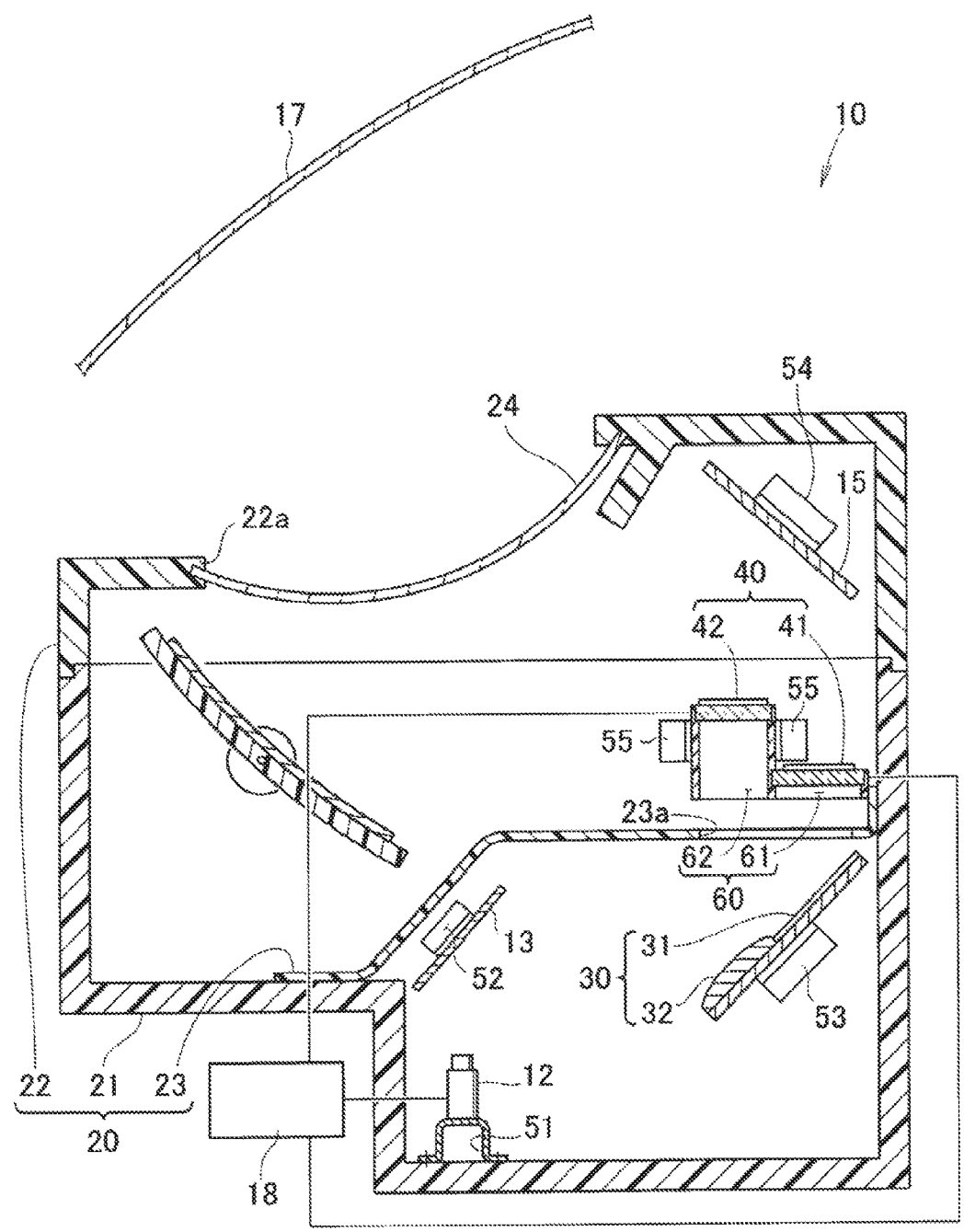
FIG. 1 is a cross sectional view illustrating a head-up display device in a reference example that is a premise of a head-up display device according to the invention.
Figure 2:
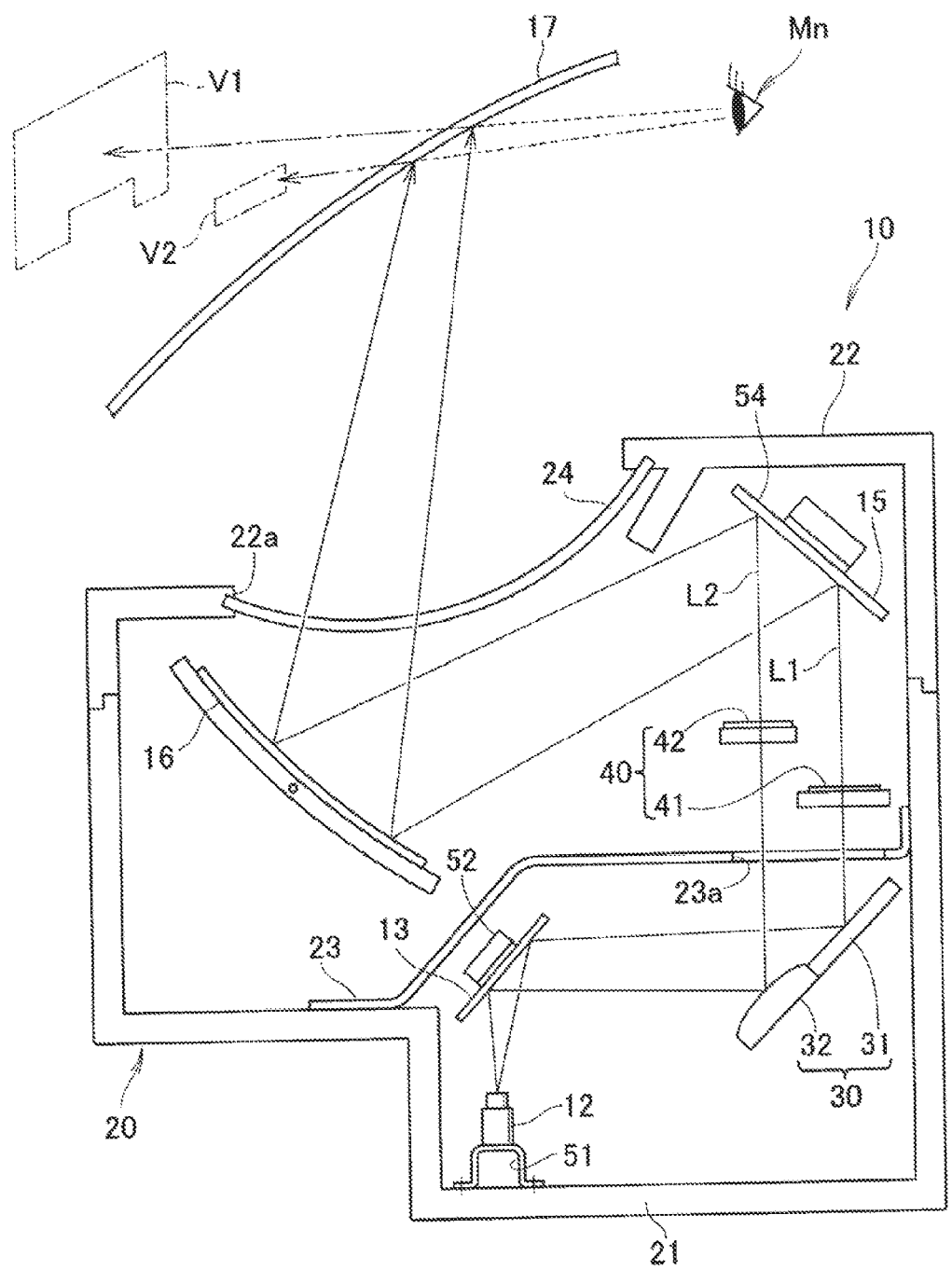
FIG. 2 illustrates the operation of the head-up display device illustrated in FIG. 1.

See FIGS. 1 and 2. A head-up display device 10 is installed in, for example, a vehicle. An occupant (operator) Mn recognizes virtual images V1 and V2 based on images projected onto a front glass 17 (projection surface 17).

The head-up display device 10 includes a case 20, a light-emitting device 12, provided at the bottom of the case 20, that can emit an image, a first flat mirror 13 reflecting light emitted from the light-emitting device 12, a reflecting mirror 30 on which the light reflected by the first flat mirror 13 is incident, a screen 40 through which the light reflected by reflecting mirror 30 passes, a second flat mirror 15 reflecting the light having passed through the screen 40, a concave mirror 16 on which the light reflected by the second flat mirror 15 is incident, the front glass 17 onto which the light reflected by the concave mirror 16 is projected, and a control unit 18 capable of controlling the light-emitting device 12 and the screen 40.

See FIG. 1. In the case 20, a lower case 21 opened toward upward is covered with an upper case 22 and an inner lid 23 is disposed in the lower case 21. The lower case 21, the upper case 22, and the inner lid 23 are formed by, for example, black synthetic resin having light shielding properties.

An opening 22a is formed in the upper surface of the upper case 22. This opening 22a is provided with a cover 24 made of transparent resin.

The inner lid 23 is provided to block external light such as sunlight. On the other hand, a part of the inner lid 23 is provided with an opening 23a through which the light emitted from the light-emitting device 12 passes.

The light-emitting device 12 is supported by a stay 51 fixed to the bottom of the lower case 21. As the light-emitting device 12, a reflective display element such as a DMD (Digital Micromirror Device) or a LCOS (registered trademark: Liquid Crystal On Silicon) or a transmissive display element such as a TFT (Thin Film Transistor) liquid crystal panel may be adopted.

The first flat mirror 13 is supported by a stay 52 fixed to the side wall of the lower case 21. The first flat mirror 13 is obtained by forming a reflecting film on the surface of a base material made of, for example, synthetic resin or a glass material using a method such as vapor deposition.

The reflecting mirror 30 is supported by a stay 53 fixed to the side wall of the lower case 21. The reflecting mirror 30 is obtained by forming a reflecting film on the surface of a base material made of, for example, synthetic resin or a glass material using a method such as vapor deposition.

The surface of the reflecting mirror 30 includes two reflecting surfaces 31 and 32 having different shapes. One of them is the first reflecting surface 31 formed in a flat mirror and the other is the second reflecting surface 32 formed in a convex mirror. The first reflecting surface 31 and the second reflecting surface 32 are formed on one base material.

It should be noted that the first reflecting surface 31 may be a curved surface that is bent instead of a flat surface. In addition, the second reflecting surface 32 may be a flat surface instead of a curved surface. In addition, both the first reflecting surface 31 and the second reflecting surface 32 may be curved surfaces. When both the first reflecting surface 31 and the second reflecting surface 32 are curved surfaces, their shapes need to be different from each other. The reason will be described later.

The screen 40 is supported by a screen holder 60. The screen 40 includes a first screen 41 through which the light reflected by the first reflecting surface 31 passes and a second screen 42 through which the light reflected by the second reflecting surface 32 passes.

The first screen 41 is a translucent screen that receives the light emitted from the light-emitting device 12 on the back surface thereof and displays a display image on the front surface. For example, a holographic diffuser, a microlens array, or a diffusion plate can be adopted as the first screen 41. The second screen 42 is similar to the first screen 41.

With respect to the lengths of the optical paths of the light having passed through the screens 41 and 42, the length of a first optical path L1 from the first screen 41 to the front glass 17 is longer than the length of a second optical path L2 from the second screen 42 to the front glass 17. That is, the first screen 41 and the second screen 42 are disposed so that the length of the first optical path L1 in which the light having passed through the first screen 41 reaches the front glass 17 is different from the length of the second optical path L2 in which the light having passed through the second screen 42 reaches the front glass 17.

The screen holder 60 is fixed to stays 55 and 55 mounted to the side wall of the lower case 21. The screen holder 60 includes a first cylindrical part 61 supporting the first screen 41 and a second cylindrical part 62 supporting the second screen 42.

It should be noted that the optical axis of the first screen 41 and the optical axis of the second screen 42 are disposed along the optical axes of the transmitting light. Accordingly, the first screen 41 and/or the second screen 42 may be inclined as appropriate with respect to the optical axes of the transmitting light. The images projected onto the front glass 17 can be inclined by inclining the screens.

The second flat mirror 15 is supported by a stay 54 fixed to the side wall of the upper case 22. The second flat mirror 15 is obtained by forming a reflecting film on the surface of a base material made of, for example, synthetic resin or a glass material using a method such as vapor deposition.

The concave mirror 16 is rotatably supported on the side wall of the upper case 22. The concave mirror 16 is obtained by forming a reflecting film on the surface of a base material made of, for example, a synthetic resin material using a method such as vapor deposition. The concave mirror 16 is a mirror having a free curved surface and further reflects the light reflected by the second flat mirror 15 to the front glass 17.

The light-emitting device 12 emits light to the first flat mirror 13 based on a control signal from the control unit 18. The emitted light is reflected to the reflecting mirror 30 by the first flat mirror 13. The reflected light is incident on the first reflecting surface 31 or the second reflecting surface 32. Whether light is incident on the first reflecting surface 31 or the second reflecting surface 32 depends on the incident position on the first flat mirror 13.

The light incident on the first reflecting surface 31 is reflected to the first screen 41. The reflected light passes through the opening 23a and passes through the first screen 41. The image to be projected onto the front glass 17 is focused by passing through the first screen 41.

The light incident on the second reflecting surface 32 is reflected to the second screen 42. The reflected light passes through the opening 23a and almost passes through the second screen 42. The image to be projected onto the front glass 17 is focused by passing through the second screen 42.

The light reflected by the first reflecting surface 31 or the second reflecting surface 32 is reflected by the second flat mirror 15, reflected by the concave mirror 16, and passes through the cover 24. The light having passed through the cover 24 is projected onto the front glass 17. The occupant Mn recognizes the images projected onto the front glass 17 as the virtual images V1 and V2 that appear in front of the front glass 17. The range of the front glass 17 to which light is projected is referred to as an eye box that can be visually recognized by the occupant Mn.

Since the concave mirror 16 and the front glass 17 are curved, the image focused on the screen 40 is also distorted. Accordingly, to prevent the virtual image recognized by the occupant from being distorted, the light-emitting device 12 emits an image having been distorted in advance.

In the head-up display device 10 as described above, the following effects are obtained.

See FIG. 2. The first screen 41 and the second screen 42 are disposed so that the length of the first optical path L1 is different from the length of the second optical path L2. The occupant Mn recognizes the image focused on the first screen 41 and the image focused on the second screen 42 so that one is projected closer to the other (see the virtual images V1 and V2). That is, a sense of depth can be generated.

On the other hand, since the first screen 41 and the second screen 42 are disposed so that the length of the first optical path L1 is different from the length of the second optical path L2, the distance from the reflecting mirror 30 to the first screen 41 is different from the distance from the reflecting mirror 30 to the second screen 42. At this time, in the first reflecting surface 31 and the second reflecting surface 32 of the reflecting mirror 30, since one reflecting surface (first reflecting surface 31) is a flat surface and the other reflecting surface (second reflecting surface 32) is a curved surface, the shapes are different from each other. That is, the shape of the first reflecting surface 31 is different from the shape of the second reflecting surface 32 so as to enable focusing on the first screen 41 and the second screen 42 having different distances from the reflecting mirror 30. This enables adjustment of focusing distances appropriate for them. At this time, the necessary number of the reflecting mirrors 30 is one. Accordingly, the number of the light-emitting devices 12 emitting light to the reflecting mirror 30 is only one. Since the number of the light-emitting devices 12 is only one, the head-up display device 10 can be low-cost and compact.

Accordingly, it is possible to provide the low-cost and compact head-up display device 10 capable of generating a sense of depth in the virtual images V1 and V2.

Figure 3:
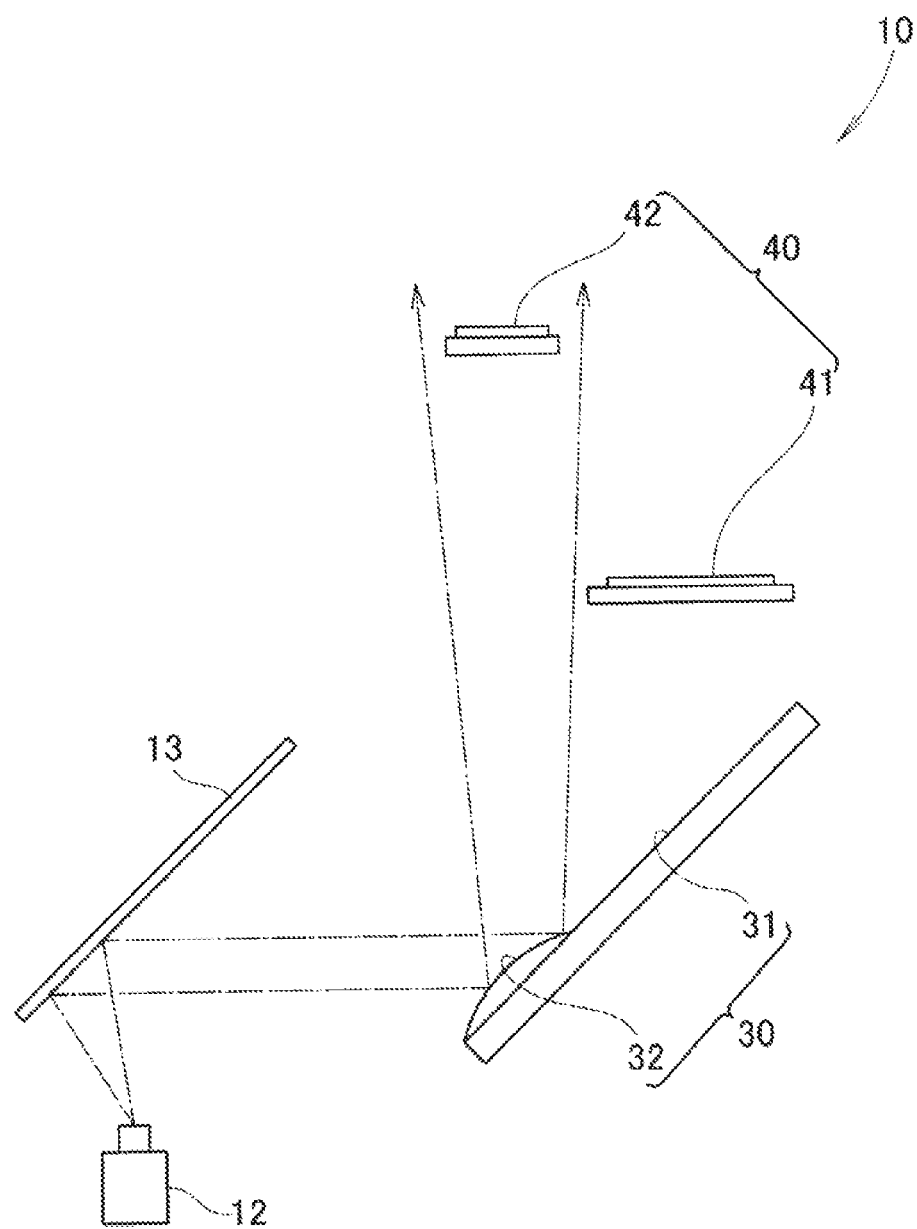
FIG. 3 illustrates problems of the head-up display device illustrated in FIG. 1.

See FIG. 3. As a result of the study by the inventor et al., the head-up display device 10 illustrated in FIG. 1 has the following problems.

See FIG. 3. The second reflecting surface 32 is configured by a convex mirror. Accordingly, the light reflected by the second reflecting surface 32 is expanded toward the second screen 42. Accordingly, a part of the light (curved surface reflected light) reflected by the second reflecting surface 32 does not pass through the second screen 42. This is problematic in terms of the efficient use of the light emitted from the light-emitting device 12.

In contrast, in order to pass all of the light reflected by the second reflecting surface 32 through the second screen 42, the size of the second screen 42 needs to be increased. Since the size of the head-up display device 10 is increased in this case, this is also problematic.

Even when the second reflecting surface 32 is configured by a concave mirror, if the second screen 42 is disposed in a position more remote from the focal distance of the mirror, similar problems occur. That is, such problems are not limited to a convex mirror.

Examples

Next, examples of the invention will be described with reference to the drawings.

Figure 4:
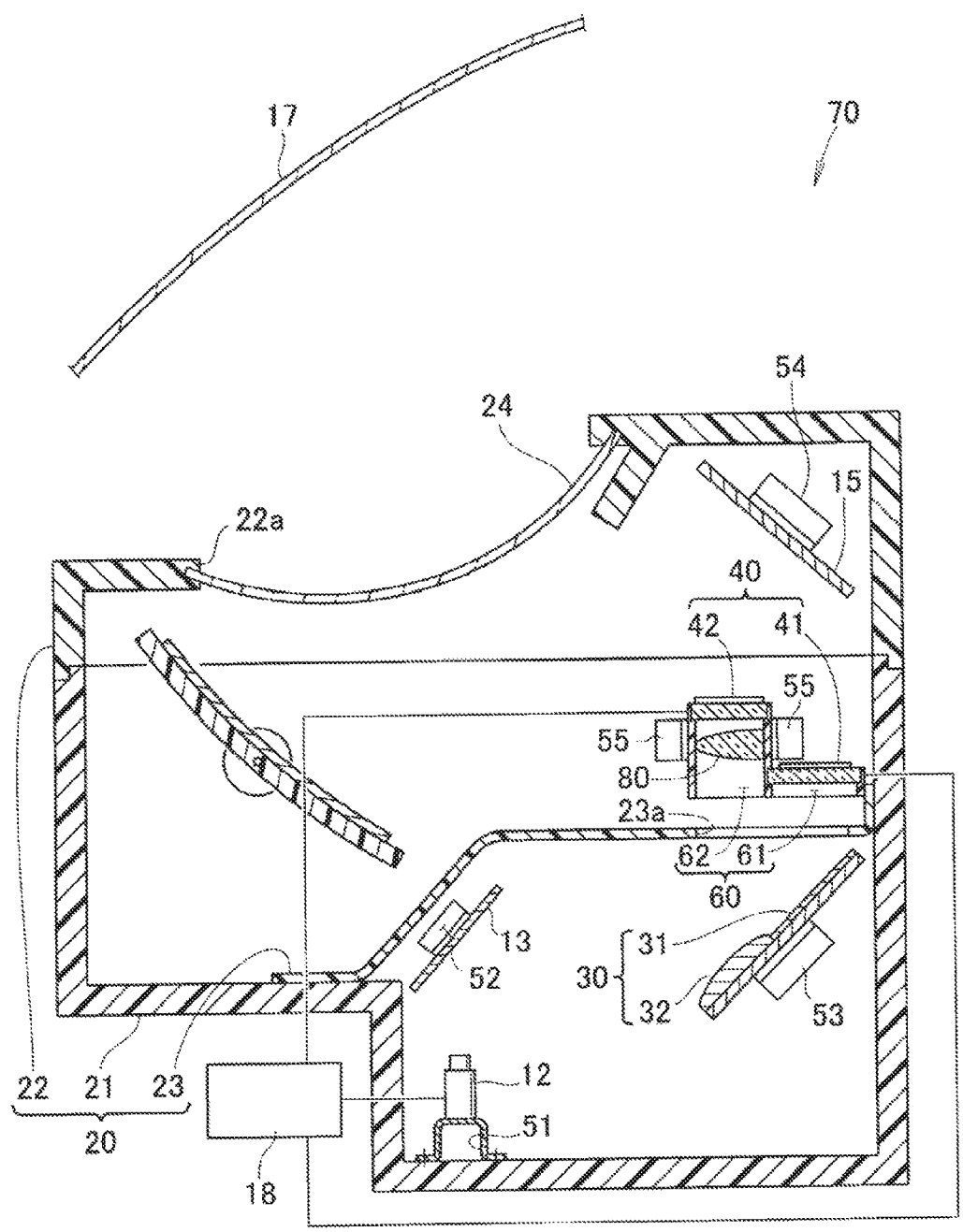
FIG. 4 is a cross sectional view illustrating a head-up display device according to an example of the invention.

See FIG. 4. FIG. 4 illustrates the cross-sectional structure of a head-up display device 70 in an example so as to correspond to FIG. 1. The head-up display device 70 according to the invention further improves the problems of the head-up display device 10 in the reference example (see FIG. 1). More specifically, a lens 80 is provided below the second screen 42. The basic structure other than this is the same as in the head-up display device in the reference example. Details will be described below.

It should be noted that components common to those of the head-up display device in the reference example are given the same reference numerals and detailed descriptions are omitted.

The second screen 42 and the lens 80 are supported by the second cylindrical part 62 of the screen holder 60. The lens 80 is disposed closer to the light-emitting device 12 than the second screen 42 with respect to the optical path.

The first screen 41, the second screen 42, and the lens 80 are supported by the screen holder 60. The screen holder 60 is configured by forming the first cylindrical part 61 supporting the first screen 41 integrally with the second cylindrical part 62 supporting the second screen 42 and the lens 80. By supporting these components using the cylindrical parts 61 and 62 separated from each other, it is possible to prevent the light that originally passes through the second screen 42 from passing through the first screen 41. In addition, since the cylindrical parts 61 and 62 are formed integrally, the screens 41 and 42 and the lens 80 can be disposed in relatively accurate positions.

Figure 5:
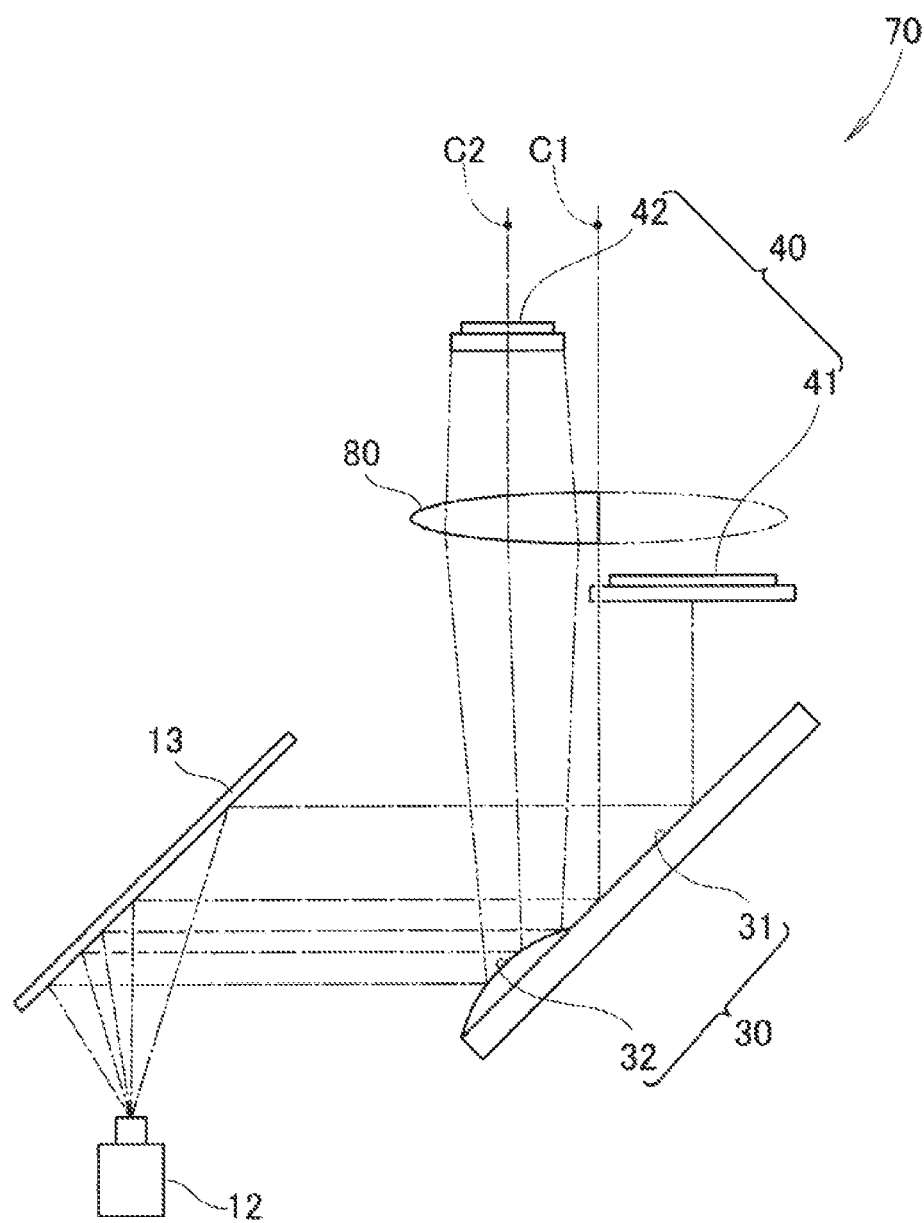
FIG. 5 is an enlarged view illustrating a main part of the head-up display device illustrated in FIG. 4.

See FIG. 5. A convex lens is adopted as the lens 80 (specifically, this convex lens does not have the portion of a general convex lens indicated by the dot-dot-dash line). Other than a convex lens, a toroidal lens having a toroidally curved surface or a free curved surface lens having a free curved surface can be used as the lens 80. In the lens 80, the curvature radius of a first cross section in the longitudinal direction of the second screen 42 (through which curved surface reflected light passes) is desirably larger than the curvature radius of a second cross section orthogonal to the first cross section.

An optical axis C1 of the lens 80 is offset with respect to an optical axis C2 of the second screen 42 through which the light (curved surface reflected light) reflected by the second reflecting surface 32 passes. In addition, the optical axis C1 of the lens 80 coincides with the optical axis of the light-emitting device 12. Accordingly, the optical axis C1 can also be the optical axis C1 of the light-emitting device 12. When a free curved surface lens is adopted as the lens 80, the optical axis C1 of the lens 80 does not need to be offset with respect to the optical axis C2 of the second screen 42.

As described above, the head-up display device 70 according to the invention also has the following effects.

The lens 80 capable of converging light is provided between the second screen 42 (screen through which curved surface reflected light passes) and the light-emitting device 12. The light reflected by the second reflecting surface 32 is reflected in various directions. Since the lens 80 capable of converging light is provided between the second screen 42 and the light-emitting device 12, the light reflected by the second reflecting surface 32 can pass through the second screen 42 without increasing the size of the second screen 42. It is possible to efficiently use the light emitted from the light-emitting device 12 without increasing the size of the head-up display device 70.

In addition, it is possible to control illumination light distribution for adjusting the light distribution with respect to a focal length in a projection optical system of the head-up display device 70. Although the projection optical system of the head-up display device 70 including the concave mirror 16 and the front glass 17 may have different focal lengths between the vertical direction and the horizontal direction, the difference in the focal lengths can be corrected by the shape of the lens 80. This can make the illumination light distribution to the eye box of the head-up display device 70 efficient.

In addition, it is possible to direct, to a predetermined position of the eye box, the light that passes through the second screen 42 through which the light reflected by the second reflecting surface 32 passes, thereby improving the uniformity of light in the eye box.

Although the head-up display device according to the invention is installed in a vehicle in the example, the head-up display device is applicable to a conveyance other than a vehicle, such as a working machine, and a construction machine. In addition, the head-up display device according to the invention is not limited to a head-up display device that uses a front glass as the projection surface, it is also applicable to a so-called combiner integrated type head-up display device in which the projection surface is integrated.

That is, the invention is not limited to the examples as long as the working effects of the invention are obtained.

INDUSTRIAL APPLICABILITY

The head-up display device according to the invention is suitable for a vehicle.

REFERENCE SIGNS LIST

12: light-emitting device
17: front glass (projection surface)
30: reflecting mirror
31: first reflecting surface
32: second reflecting surface
40: screen
41: first screen
42: second screen (screen through which curved surface reflected light passes)
70: head-up display device
80: lens
C1: optical axis of lens
C2: optical axis (optical axis of screen through which curved surface reflected light passes) of (second screen)
L1: first optical path
L2: second optical path

The invention claimed is:
1. A head-up display device comprising:
a light-emitting device that emits the light representing an image;
a reflecting mirror reflecting the light emitted from the light-emitting device,
wherein the reflecting mirror comprises:
  a first reflecting surface comprising a curved surface;
  a second reflecting surface comprising a flat surface; and
  a base material comprising a first surface and a second surface opposite the first surface, and
  wherein the first reflecting surface and the second reflecting surface are formed on the first surface of the base material, and
  wherein the light emitted from the light-emitting device is incident on the first reflecting surface and the second reflecting surface;
a screen on which the light reflected by the reflecting mirror is focused and through which the light passes,
wherein the screen comprises:
  a first screen through which the light reflected by the first reflecting surface passes; and
  a second screen through which the light reflected by the second reflecting surface passes, and
  wherein the first screen and the second screen are disposed so that a length of a first optical path in which the light having passed through the first screen reaches a projection surface is different from a length of a second optical path in which the light having passed through the second screen reaches the projection surface; and
a lens provided between the light-emitting device and the first screen through which the light reflected by the first reflecting surface passes, wherein the lens converges the light to the first screen.
2. The head-up display device according to claim 1, wherein the lens is a convex lens, a toroidal lens, or a free curved surface lens.

3. The head-up display device according to claim 2, wherein an optical axis of the lens is offset with respect to an optical axis of the first screen through which the light reflected by the first reflecting surface passes.

4. The head-up display device according to claim 1, wherein an optical axis of the lens is offset with respect to an optical axis of the first screen through which the light reflected by the first reflecting surface passes.

5. A head-up display device comprising:
a light-emitting device that emits the light representing an image;
a reflecting mirror reflecting the light emitted from the light-emitting device, wherein the reflecting mirror comprises:
  a first reflecting surface comprising a curved surface having a first curvature;
  a second reflecting surface comprising a curved surface having a second curvature different from the first curvature; and
  a base material comprising a first surface and a second surface opposite the first surface,
  wherein the first reflecting surface and the second reflecting surface are formed on the first surface of the base material, and
  wherein the light emitted from the light-emitting device is incident on the first reflecting surface and the second reflecting surface;
a screen on which the light reflected by the reflecting mirror is focused and through which the light passes, wherein the screen comprises:
  a first screen through which the light reflected by the first reflecting surface passes; and
  a second screen through which the light reflected by the second reflecting surface passes, and
  wherein the first screen and the second screen are disposed so that a length of a first optical path in which the light having passed through the first screen reaches a projection surface is different from a length of a second optical path in which the light having passed through the second screen reaches the projection surface; and
a lens provided between the light-emitting device and the screen, wherein the lens converges the light to the screen.

6. The head-up display device according to claim 5, wherein the lens is a convex lens, a toroidal lens, or a free curved surface lens.

7. The head-up display device according to claim 6, wherein an optical axis of the lens is offset with respect to an optical axis of the screen.

8. The head-up display device according to claim 5, wherein an optical axis of the lens is offset with respect to an optical axis of the screen.

* * * * *